United States Patent [19]
Schulze et al.

[11] Patent Number: 5,413,357
[45] Date of Patent: May 9, 1995

[54] PROGRAM CONTROLLED ENTERTAINMENT AND GAME APPARATUS

[75] Inventors: Ullrich Schulze, Wiesbaden; Horst Niederlein, Bingen; Peter Kuhn, Wiesbaden; Armin Frank, Mönchweiler, all of Germany

[73] Assignee: NSM Aktiengesellschaft, Bingen, Germany

[21] Appl. No.: 83,769

[22] Filed: Jun. 30, 1993

[30] Foreign Application Priority Data

Jul. 6, 1992 [DE] Germany .................. 42 22 110.2

[51] Int. Cl.⁶ .................................................. A63F 9/22
[52] U.S. Cl. .................................... 273/436; 273/438
[58] Field of Search ............... 273/433, 434, 435, 436, 273/437, 438

[56] References Cited
U.S. PATENT DOCUMENTS

| | | | |
|---|---|---|---|
| 4,521,014 | 6/1985 | Sistrick | 273/434 |
| 4,754,268 | 6/1988 | Mori | 273/438 X |
| 4,799,677 | 1/1989 | Fredericksen | 273/435 |
| 4,844,476 | 7/1989 | Becker | 273/434 X |
| 4,869,500 | 9/1989 | Williams | 273/434 X |
| 5,078,399 | 1/1992 | Lennon, Jr. | 273/434 X |
| 5,149,104 | 9/1992 | Edelstein | 273/434 |
| 5,241,399 | 8/1993 | Kanamaru | 358/341 |
| 5,241,671 | 8/1993 | Reed et al. | 395/600 |

*Primary Examiner*—William H. Grieb
*Attorney, Agent, or Firm*—Spencer, Frank & Schneider

[57] ABSTRACT

The present invention relates to a program controlled entertainment and game device which includes a housing, a display unit connected with the housing and preferably provided within the housing, operating elements associated with the housing, and a playback unit associated with the housing for a CD-I disc on which the program and data informations are stored. Preferably the entertainment and game device according to the invention is employed as a coin-operated game, merchandise dispensing machine or a skill testing device.

30 Claims, 8 Drawing Sheets

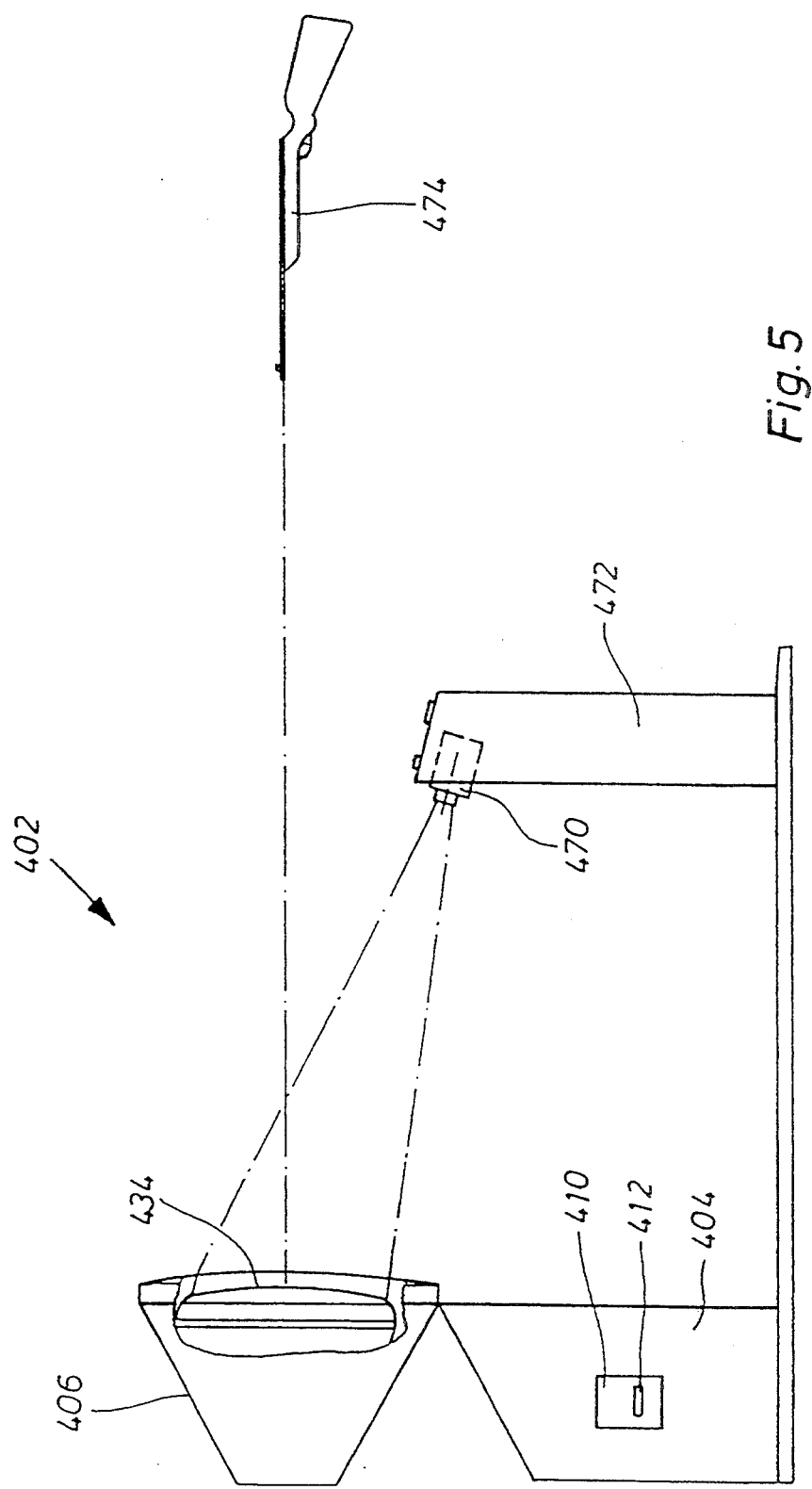

PROGRAM CONTROLLED ENTERTAINMENT AND GAME APPARATUS

BACKGROUND OF THE INVENTION

1. Field of the Invention

The present invention relates to a program controlled entertainment and game apparatus including a housing, a display unit connected with the housing, particularly arranged therein, and operating elements associated with the housing.

2. Description of the Related Art

In the recent past, computers have been put to use in ever broader fields. In order to realize the greatest possible versatility, various storage media have been developed for programs and data, for example, magnetic discs, diskettes, the so-called compact discs, programmable memory components, such as ROMs, etc.

Customarily, programs are stored, for example, in ROMs where they can be modified according to existing conditions. The memory volumes of such ROMs, however, are limited as a whole so that the program volume that can be stored therein is not suitable for all applications.

The requirements for storage of data and programs have increased in the past. With increasing sales of personal computers, more and more applications are transferred to such computers. However, this means that these personal computers must be able to run many types of programs.

Further memory and output media have therefore been developed to enable the playing back of video and audio informations simultaneously, particularly if these are composed of large quantities of data. These memory and output media are the so-called CD-I (compact disc-interactive) discs on which such informations are all stored digitally according to the so-called CD-I standard. Thus, CD-I discs are able to simultaneously contain program and data informations, with the respective program informations permitting access to the corresponding data and enabling interactive control operations. Since this can take place in real-time operation, a plurality of possible uses results. It is possible to read video, audio and program informations only at the moment of access to the record, to intermediately store these data and to then display them as an interactive program. In this way it is possible to switch back and forth without loss of time between various program and data structures.

To improve the operating characteristics and increase comfort, special information devices have been developed which include a viewing screen, an operator console and a housing in which it is possible to arrange the screen and the operating elements to suit the individual operator. For this purpose, the operator console is configured as an independent operator desk which is arranged at an adjustable distance from the video tube and is guided in guide rails at the bottom. A housing accommodating the screen is configured so that its inclination can be adjusted. This configuration makes it possible for the operator to provide for an optimum sitting position and simultaneously have a favorable slope of the screen. The distance from the screen can thus be adapted to physical requirements and, at the same time, the operating elements can be placed in an ergonomic arrangement. In this way, the respective device can be operated without fatigue for a longer period of time.

To facilitate operation of the device and to have a better overview, large screen projector arrangements have also been developed for entertainment devices and make it possible to make the operation and design of the device more versatile, with greater enticement for playing them, thus increasing their entertainment value. For this purpose, an image recording device is provided which covers the playing field, as is a projector connected with it and a projection wall onto which the recorded image of the playing field can be projected. The enlarged projected image can then be observed precisely by one or even several players. Joint playing by several persons on one apparatus is much facilitated in this way. In addition to the respective active players, others not participating in the game are able to watch the game without interfering with the players and are able to give suggestions and advice to the players. It has been proposed to associate an operator desk with such an entertainment device that operates with projection, with the operator desk being equipped with the same operating members as the actual entertainment apparatus. It should here be possible to display individual regions of the playing field in a large or small format under control of keys or a computer. The simultaneous projection of different playing fields is also provided. The playing together of several players with and against each other is thus enhanced.

SUMMARY OF THE INVENTION

It is an object of the present invention to create an entertainment and game apparatus which permits versatile and interesting playing operations.

This is accomplished according to the present invention by a program controlled entertainment and game apparatus comprising a housing, a display unit connected with the housing, particularly arranged within the housing, and operating elements associated with the housing, as well as a playback unit associated with the housing for a CD-I disc on which the program and data informations are stored.

Advantageous features of the game apparatus according to the invention are defined in the dependent claims.

Thus, a program controlled entertainment and game apparatus according to the invention includes a CD-I disc playback unit on which program and data informations are stored.

The advantage of the program controlled entertainment and game apparatus according to the invention is that the use of the device is determined by the program stored on the CD-I disc. In this way it is possible to configure the entertainment and game device specifically for the required functions. The CD-I disc makes the game unexpectedly versatile. Different playing functions can be interactively selected and combined with one another at the highest speed, Thus, if a certain function is selected and displayed immediately thereafter, further playing functions can be selected therefrom. Thus, the game jumps from one game plane to the next, with it of course being possible to alternatingly jump out of and into the various planes at any time. Compared to conventional entertainment and game apparatuses, this considerably increases playing possibilities.

In the entertainment and game apparatus according to the invention, the CD-I playback unit is advantageously connected with the housing, preferably it is integrated in the housing. The CD-I playback unit then advisably has an associated record magazine. As an alternative, however, several playback units and several record magazines may be provided as this is possible already for CD changers. In this way it is possible, on the one hand, to quickly exchange various game varieties and thus apparatus functions; on the other hand, various terminals may be operated by such a device. Moreover, several devices may be combined into groups which are networked with one another, thus providing the possibility of several players playing interactively against one another in groups. For example, the players may play for a jackpot. Moreover, these groups may be connected to a common central coin processing device.

A keyboard and/or a mouse may be provided as operating elements as they are employed in a personal computer. Or, a joystick or laser beam may be employed. As an alternative or in addition, an operator keyboard or operating elements may be provided on the screen. In this way, the player is able to subjectively enter into the game in that his hands are active on the playing field.

An advantageous embodiment of the entertainment and game apparatus according to the invention includes an operator desk which may also be provided additionally. Furthermore, it is possible to play by means of a remote control unit. In another preferred embodiment of the invention, at least some of the operating elements are configured to be voice controlled.

In order to permit playing while including several players or third non-playing parties, the display unit advantageously includes a large size projection or TV screen which is preferably associated with an operator desk assigned to the device.

Preferably, a device is provided by means of which at least individual regions of the display can be selected and displayed under the control of a computer in a large or small size format. This considerably facilitates interactive play. Since playing regions that are presently in use are highlighted, the player then sees only the display and operator functions of interest at the moment so that he is able to concentrate more than before on the game itself.

In order to clarify the jumping functions made possible by the interactive play in various function regions and game planes, it is advantageously possible to provide several displays simultaneously on the display unit. In this way, the player is able, on the one hand, to have a better view of the game region presently in use. On the other hand, he is able to look at other game regions that might be of interest later.

For jumping operation, it is advisable to provide a selection device by means of which functions associated with the display elements can be selected for further operation of the device.

According to a preferred embodiment of the program controlled entertainment and game device according to the invention, a device is provided for coin input, checking and return.

The program controlled entertainment and game device according to the invention is preferably employed as a coin-operated device. The practical configuration may be thus, for example, that a conventional coin-operated game is illustrated on the screen, with all functions of the entire coin-operated game being contained in the software of the CD-I disc, namely the playing symbols in the form of rotary discs or rollers or the like and risk scales, play-out scales or the like. By means of operator elements associated with the housing, such as start, stop and odds keys, the illustrated coin-operated game device is operated in the conventional manner. As an alternative, the coin-operated game device may also include in a conventional manner a real symbol game device composed of rotary discs and/or rollers. Since the CD-I disc contains all program portions of a prior art game apparatus, it is merely necessary to exchange CD-I discs when the game system is to be changed. If necessary, the front panel of the device may also be exchanged. However, it is also possible to store a plurality of game systems on the CD-I disc which can then be selected under the control of a keyboard or computer.

It is particularly favorable for interactive game operation if a risk scale composed of several display elements that indicate individual winnings is provided if already obtained winnings are to be wagered with the risk that they might be lost. During game operation the risk scale may be changed, for example, the player may jump back and forth depending on the momentarily existing winnings constellation. For example, a special game device may also be provided. Furthermore, the coin-operated game apparatus may include a play-out unit equipped with a separate display field which can be optically highlighted if a random or predetermined event occurs. If there is optical highlighting, the game is controlled in such a manner that at least the next amount of winnings to be wagered can be risked without the danger of a loss.

To facilitate interactive playing, a selector device may be provided by means of which the subsequent game operation can be performed at selected game elements and the selected game elements are displayed to a larger scale.

A further preferred use of the program controlled entertainment and game device according to the invention is its use as an automatic merchandise dispensing device. In such automatic dispensers the merchandise contained in the software of the CD-I disc is offered at certain values and is dispensed according to the resulting game winnings.

Another preferred use for the entertainment and game device according to the invention is its use as a game of skill. In this case, different time, size, detection and/or memory phases in various skill stages may be displayed interactively by access to the CD-I disc containing the software. For example, under the control of a keyboard or the computer, a window displays the recognition of, for example, the emblem of a town, in a medium difficulty skill stage to be guessed by depression of a key from several available possibilities during a certain time unit. If the guess is correct, a prize of any desired shape is awarded. Thus countless game variations result so that the enticement to play is significantly increased for skilled players, particularly with respect to their reaction times. In this connection it must be considered that, on the one hand, the possibilities for combinations and selections are significantly greater for the player than in the past. On the other hand, the response of the device is considerably accelerated compared to presently employed automatic devices.

A preferred embodiment of the skill game according to the invention is configured as a firing simulator in which the display unit includes a screen serving as the firing field and a camera connected with a storage and evaluation unit which scans the hits produced and visible on the screen by means of an optical firearm. In this case, it is advisable to display the evaluation together with the firing field. Simulated firing is thus possible in a manner that is interesting for the player.

Moreover, a game-of-skill apparatus according to the invention may advantageously include an evaluation for game operations with several players in that the evaluation unit displays the action of one respective player and/or of all players. Simultaneous display considerably increases the attraction of the game.

Finally the entertainment and game device may preferably be employed as an information terminal, with the program in the CD-I disc containing additional informations, such as user guidance, a city map, directional signs and the like.

BRIEF DESCRIPTION OF THE DRAWINGS

The invention will now be described in greater detail with reference to several embodiments thereof that are illustrated in the drawing figures in which:

FIG. 5 depicts a fourth embodiment of the program controlled entertainment and game device according to the invention which is configured as an automatic skill game (firing simulator).

DETAILED DESCRIPTION OF THE PREFERRED EMBODIMENTS

Figure 1:
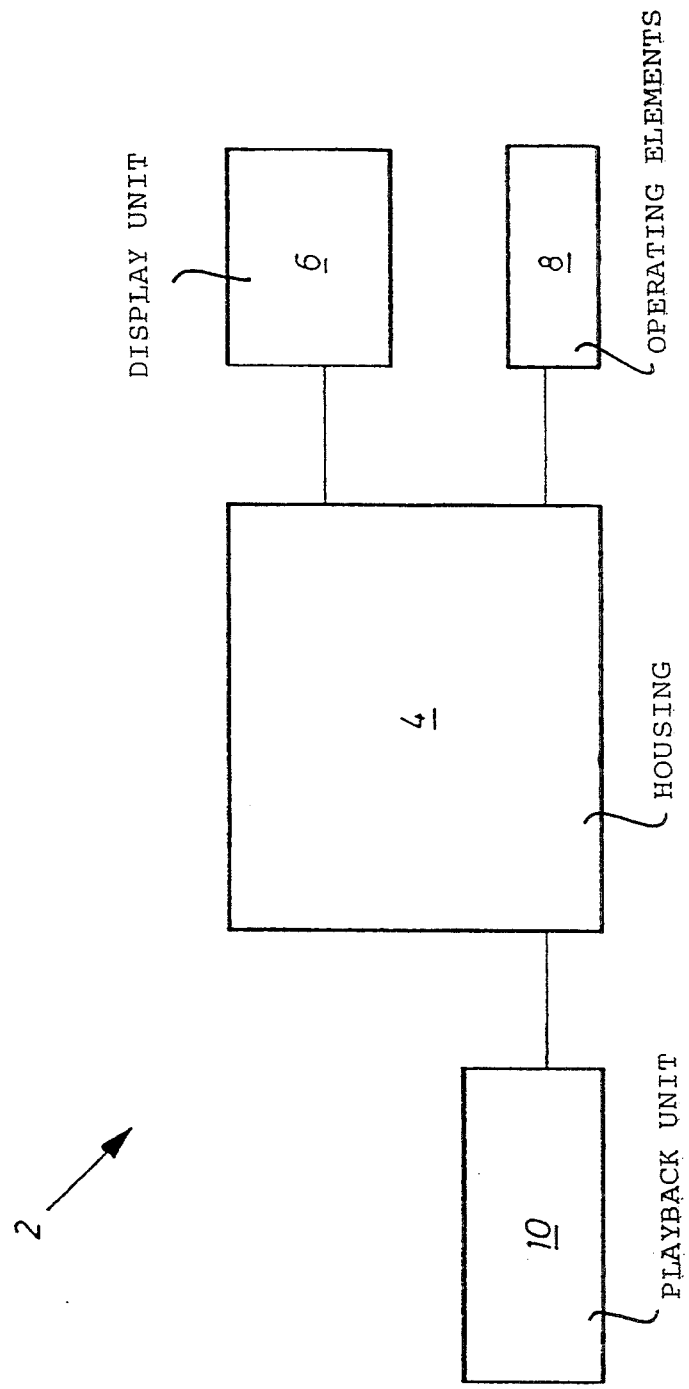
FIG. 1 is a schematic diagram illustrating the basic configuration of a program controlled entertainment and game device according to the invention.

Initially the basic configuration of a program controlled entertainment and game device according to the invention will be described with reference to FIG. 1. The entertainment and game device 2 includes a housing 4 which is connected to a display unit 6. The housing further has associated operating elements 8. A playback unit 10 for a CD-I disc on which the program and data informations are stored is also associated with housing 4.

Figure 2A:
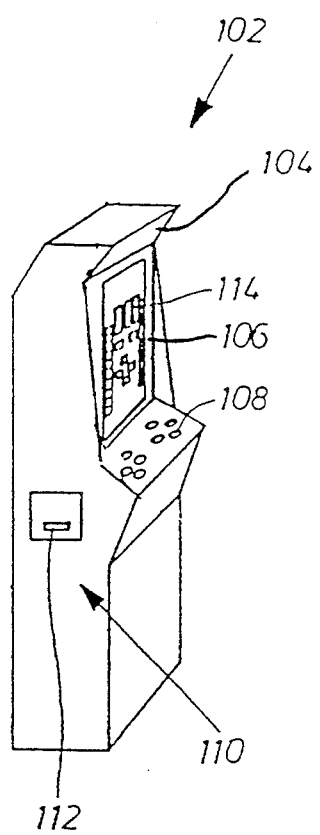
FIG. 2A depicts a perspective view of a game unit according to the present invention.
Figure 2B:
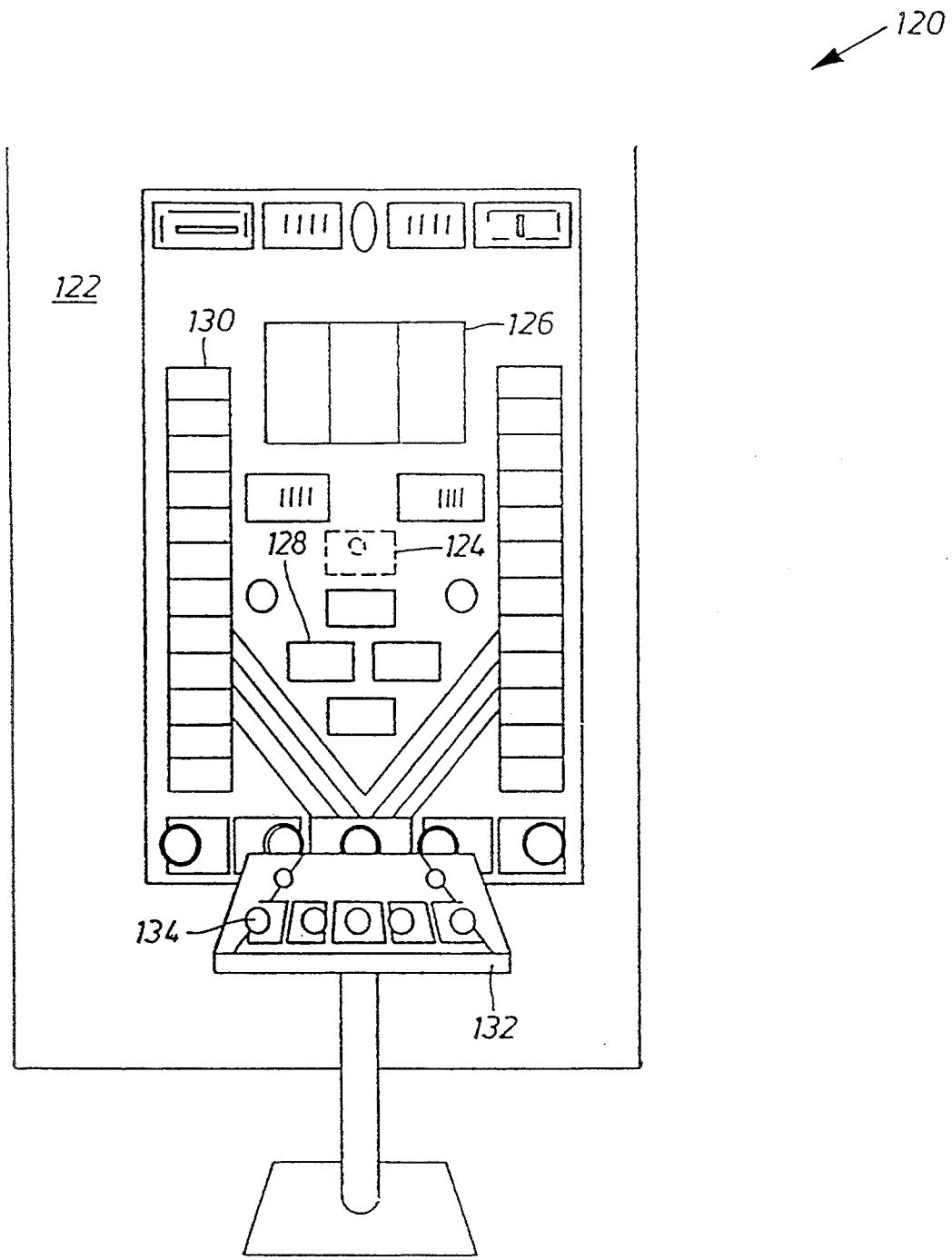
FIG. 2B depicts a front view of a projection arrangement according to the present invention.
Figure 2C:
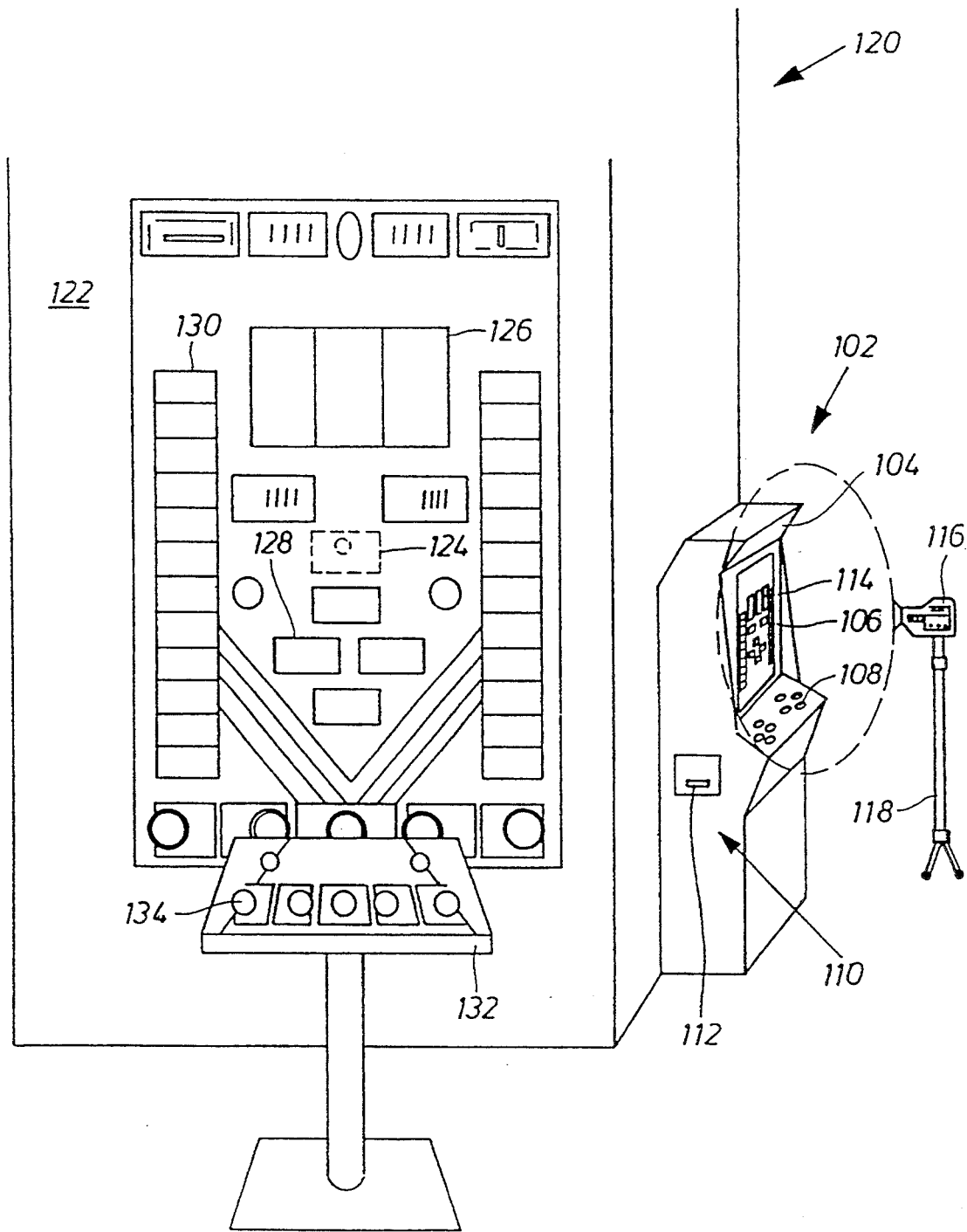
FIG. 2C depicts a first embodiment of a program controlled playing and entertainment device according to the invention equipped with a large-size projection screen.

FIG. 2 depicts a first embodiment of the entertainment and game device 102 according to the invention which is employed as a coin operated device. Device 102 shown in FIG. 2A, includes a viewing screen 106 that is employed as display unit and is disposed on the frontal face of a housing 104. Operating elements 108, such as joysticks, mice, laser beams or voice controlled devices, are disposed below display unit 106. A playback unit 110 for the respective CD-I disc is disposed in the side of housing 104. This playback unit includes a receiving slot 112 for the CD-I disc. The frontal face of a conventional coin-operated device (see 114) is depicted on screen 106. The program loaded on the CD-I disc and the corresponding data informations cause the entertainment and game device 102 to act as a coin-operated game device. It can be operated by means of operating elements 108, such as mice, joysticks, laser beams and voice controlled devices.

In order to permit simultaneous playing or at least observation by several persons, entertainment and game device 102 is provided with an enlarged display of the image of the coin-operated device. For this purpose, a camera 116 is disposed on a tripod 118 opposite viewing screen 106.

A projection arrangement 120, shown in FIG. 2B, is provided to display the image recorded by camera 116. This projection arrangement includes a projection wall 122, a projector 124 connected with camera 116 to project the image recorded by camera 116 onto projection wall 122. The projected image clearly shows an enlargement of the conventional coin-operated game device shown on screen 106. The device includes a symbol game device 126, various displays 128 and two risk scales 130.

An operator desk 132 is disposed in front of projection arrangement 120 and is equipped with operating elements 134 that correspond to operating elements 108, Several persons are able to stand around this operator desk 132 without blocking each other's view of the display unit, namely projection wall 122.

Figure 3:
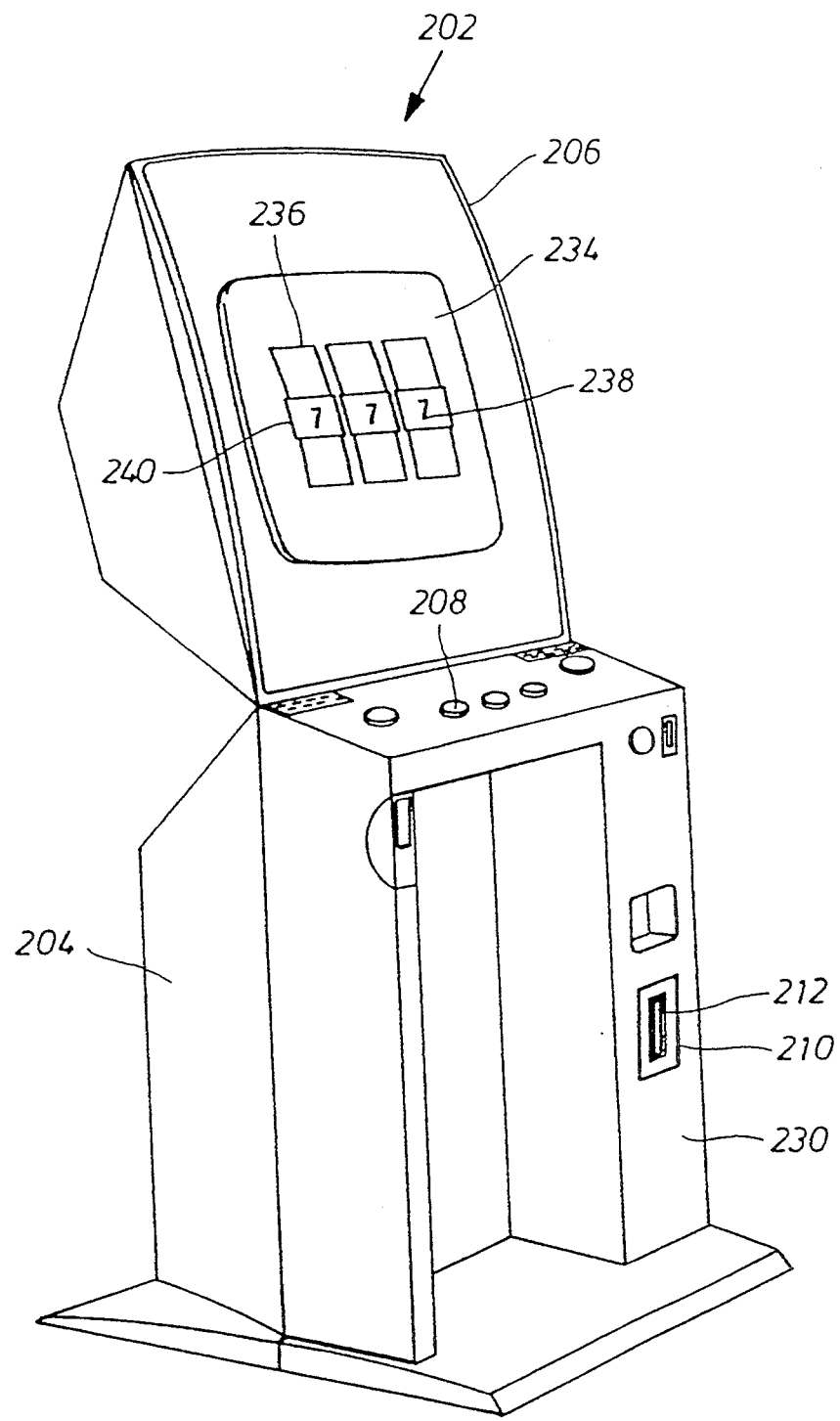
FIG. 3 depicts a second embodiment of a program controlled entertainment and game device according to the invention equipped with an operator desk and an adjustable display unit.

FIG. 3 shows a second embodiment of the program controlled entertainment and game device 202 according to the invention which, as in the first embodiment, is configured as a coin-operated game device. It includes a housing 204 equipped with an integrated operator desk 230 in which a playback unit 210 equipped with a receiving slot 212 for a CD-I disc is provided. At the top of the operator desk 230 operating elements 208 are provided. A screen display unit 206 is pivotally arranged on operator desk 230. Viewing screen 234 is pivotal within display unit 206.

By means of the inserted CD-I disc, a game sequence can be realized in the same manner as in a conventional coin-operated game device. Correspondingly coin-operated game elements are shown which can be operated in the conventional manner, but with utilization of the CD-I based interactive, much more interesting manner of playing.

Rollers 236 are shown on screen 234. The rollers each carry the game symbols 238; read-out window 240, in which these game symbols 238 become visible, permit the display of certain symbol combinations which lead, depending on the type of game, to win or loss. This is only one of the possible playing variations that can be played by means of the coin-operated game device according to the invention. For example, a credit may be displayed, a special game situation, a risk game device etc. may be displayed by means of the screen-type display unit 206.

Figure 4:
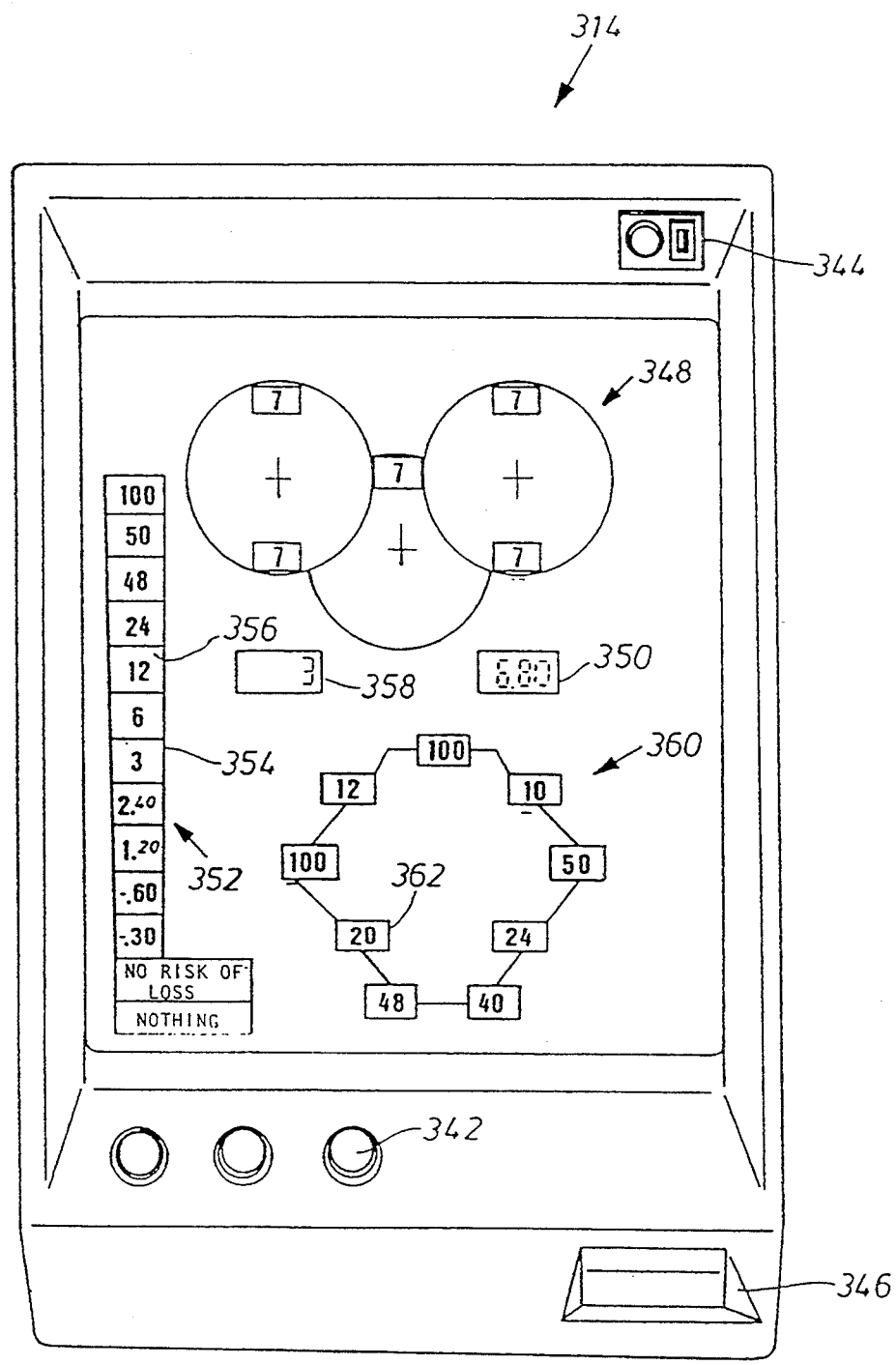
FIG. 4 depicts an example of a screen display in a third embodiment of the program controlled entertainment and game device in the form of a coin-operated apparatus.

FIG. 4 depicts a third embodiment of a program controlled entertainment and game device according to the invention in which only the representation 314 of a coin-operated device is illustrated. Regarding housing, viewing screen, etc. these may be configured as in the first two embodiments, above. The operation is effected, of course, by way of operating elements which are also not shown in FIG. 4 but which, in their functions, correspond to conventional operator elements 342, such as mice joysticks, laser beams and voice-controlled devices. The coin insertion/return elements 344, 346 of the conventional coin-operated game device are of course arranged correspondingly at the housing of the coin-operated device according to the second embodiment described above. The description below serves the purpose of illustrating the playing possibilities offered by the coin-operated game device according to the invention.

A symbol game device 348 is provided. On the right below the symbol game device there is a coin storage display 350 which may of course be provided once more at the housing of the coin-operated game device according to the invention. On the left in the region of the front plate there is disposed a gambling device 352 which includes several display elements 356 that are combined into a risk scale 354. The display elements 356 are provided with different displays of winnings which, in the lower region, indicate money won and, in the upper region, special game prizes. The winnings indicated on risk scale 354 may be gambled. By actuation of a corresponding operator key, either the next higher winnings are realized or the amount wagered is lost. The winnings realized in this wagering game, that is, special game prizes and money won, are displayed in a special game display 358 and in coin display 350, respectively. In addition to the game by means of the wagering device which promises a certain number of special games at more favorable odds in addition to a fixed amount of winnings, a play-out device 360 may be provided by means of which the number of special games obtained in symbol game device 348 can be randomly increased or reduced to a certain number. The play-out device 360 includes display fields 362 which display different numbers of special games. If a play-out operation is completed with a highlighted display field 362, the correspondingly displayed number of special games has been reached. Thus, a certain number of special games always remains in effect.

Figure 4A:
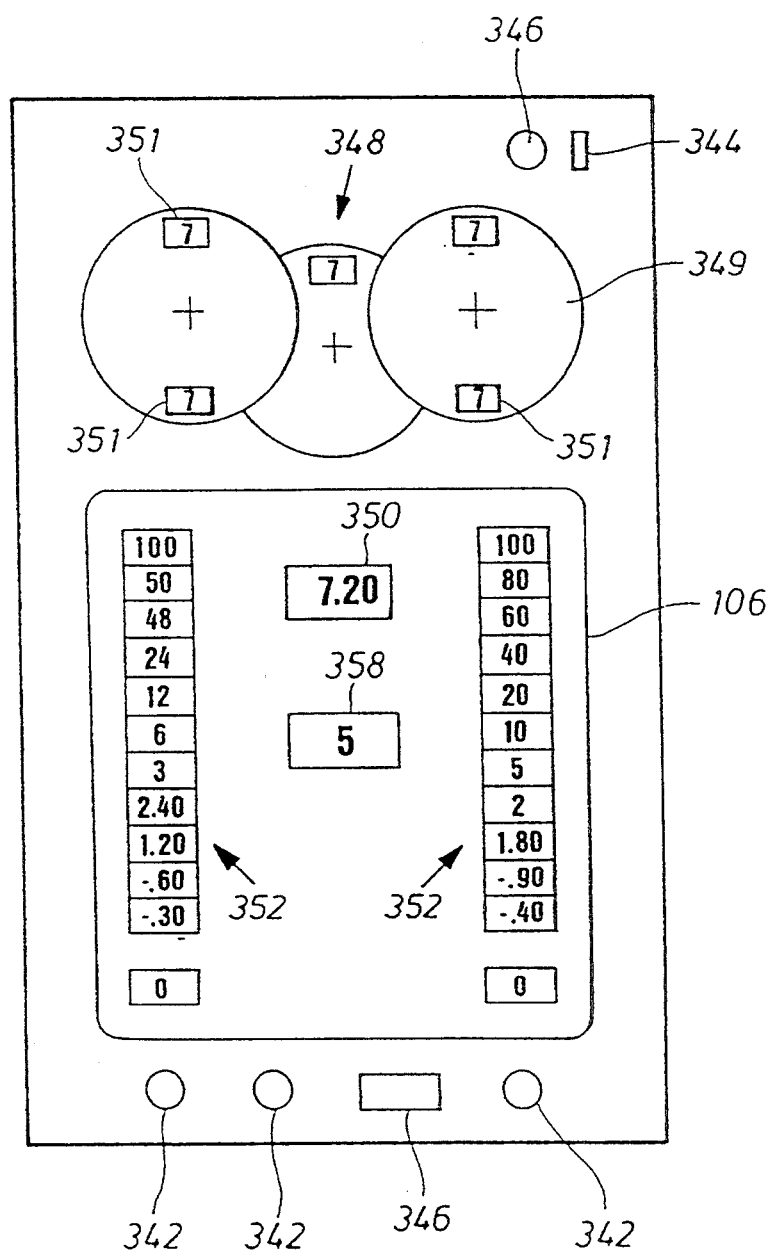
FIG. 4a depicts an alternative embodiment of the coin-operated apparatus according to FIG. 4.

In the alternative coin-operated device shown in FIG. 4a, the symbol game device 348 is not realized on the screen 106 employed as the display unit but is produced in a known manner of substantive rotating discs 349 that are covered by symbols and are associated with read-out windows 351. In that case, two wagering devices are shown on screen 106, between which it is possible to jump back and forth, possibly under the control of a key or by the software on the CD-I disc, so that the playing of the wagering game is provided with a greater enticement for playing.

FIG. 5 depicts a fourth embodiment of a program controlled entertainment and game device 402 according to the invention which is configured as a game-of-skill apparatus (firing simulator). It includes a housing 404 equipped with a CD-I playback unit 410 having a closable receiving slot 412. A display unit 406 in the form of a viewing screen is pivotally arranged on housing 404. Screen 434 serves as firing field and is scanned by means of a camera 470 that is installed in a console 472. A conventional firearm 474 operating with a laser aiming device is directed onto screen 434. Visible hits realized on screen 434 are recorded by means of camera 470 and transmitted to a connected memory evaluation unit. The evaluated results may again be displayed on screen 434.

Of course, the present invention is not limited to the illustrated and described embodiments. It also includes other configurations and partial combinations of the described and/or illustrated features.

It will be understood that the above description of the present invention is susceptible to various modifications, changes and adaptations, and the same are intended to be comprehended within the meaning and range of equivalents of the appended claims.

What is claimed is:

1. A program-controlled coin-operated entertainment and game device comprising:
   a housing;
   a display unit arranged within the housing;
   means for receiving and verifying a coin;
   operating elements associated with the housing; and
   a playback unit associated with the housing for a CD-I disc on which program and data informations are stored, the playback unit being responsive to the means for receiving and verifying the coin when the coin is verified for causing the program and data informations stored on the CD-I disk to provide an entertainment function.

2. A program-controlled coin-operated entertainment and game device as defined in claim 1, wherein the CD-I playback unit is connected with the housing and integrated in the housing.

3. A program-controlled coin-operated entertainment and game device as defined in claim 1, wherein the CD-I playback unit has at least one associated record magazine.

4. A program-controlled coin-operated entertainment and game device as defined in claim 1, wherein a plurality of CD-I playback units each having a plurality of record magazines are associated with the housing.

5. A program controlled coin-operated entertainment and game device as defined in claim 1, wherein a keyboard and/or mouse are provided as the operating elements.

6. A program controlled coin-operated entertainment and game device as defined in claim 1, wherein the operating keyboard/elements are provided on the viewing screen.

7. A program controlled coin-operated entertainment and game device as defined in claim 1, wherein a joystick or a laser beam are provided as the operating elements.

8. A program controlled coin-operated entertainment and game device as defined in claim 1, wherein the device has an associated operator desk.

9. A program controlled coin-operated entertainment and game device as defined in claim 1, wherein a remote control unit is provided.

10. A program controlled coin-operated entertainment and game device as defined in claim 1, wherein the operating elements are configured to be voice controlled.

11. A program controlled coin-operated entertainment and game device as defined in claim 1, wherein the display unit includes a display screen which has an associated operating desk that is connected with the device.

12. A program-controlled coin-operated entertainment and game device as defined in claim 1, wherein a device is provided by means of which at least individual regions of the display can be selected under the control of a computer and can be displayed in an enlarged or reduced format.

13. A program-controlled coin-operated entertainment and game device as defined in claim 12, wherein it is possible to display several displays simultaneously on the display unit.

14. A program controlled coin-operated entertainment and game device as defined in claim 1, wherein a selection device is provided by means of which instrument functions associated with the display elements can be selected for further operation of the device.

15. A program-controlled coin-operated entertainment and game device as defined in claim 1, wherein the means for receiving and verifying a coin further provides for return of a coin.

16. A program-controlled coin-operated entertainment and game device as defined in claim 1, wherein the CD-I disc is exchangeable.

17. A program-controlled coin-operated entertainment and game device as defined in claim 16, further comprising rotary discs or rollers.

18. A program-controlled coin-operated entertainment and game device as defined in claim 17, wherein, if already won winnings are wagered whose loss would increase the risk, the device includes a risk scale that can be displayed on the display unit and is composed of a plurality of indicator units for displaying individual winnings.

19. A program-controlled coin-operated entertainment and game device as defined in claim 17, further comprising a plurality of wagering devices between which a player is able to jump back and forth under control of a keyboard or by software on the CD-I disc.

20. A program controlled coin-operated entertainment and game device as defined in claim 1, further comprising a special game device.

21. A program controlled coin-operated entertainment and game device as defined in claim 1, further comprising a playback unit having a separate display field which, if a random or predetermined event occurs, highlights that event optically, with at least the riskable winnings next to the highlighted winnings being realizable under control of the game without danger of a loss.

22. A program-controlled coin-operated entertainment and game device as defined in claim 1, further comprising a selection device providing that subsequent game operation can be performed at selected game elements and the selected game elements are shown by an enlarged scale.

23. A program-controlled coin-operated entertainment and game device as defined in claim 1, wherein the device dispenses merchandise, the merchandise being contained in software on the CD-I and is offered at certain score values and is dispensed according to the score obtained.

24. A program-controlled coin-operated entertainment and game device as defined in claim 1, wherein different time, magnitude, recognition and/or memory phases are interactively displayed in different skill stages by way of access to software contained in the CD-I disc.

25. A program-controlled coin-operated entertainment and game device as defined in claim 24, wherein the device is configured as a firing simulator in which the display unit includes a viewing screen serving as a firing field and a camera connected with a memory and evaluation unit, with said camera scanning the visible hits created on the screen by an optical firearm.

26. A program-controlled coin-operated entertainment and game device as defined in claim 25, wherein a display of an evaluation by the evaluation unit is provided simultaneously with the firing field.

27. A program-controlled coin-operated entertainment and game device as defined in claim 24, further comprising an evaluation unit for playing with a plurality of players in such a manner that an evaluation display of a respective player and/or of all players is displayed.

28. A program controlled coin-operated entertainment and game device as defined in claim 1, wherein it is additionally configured as an information terminal for display of information for user guidance, a city map, or direction signs.

29. A program controlled coin-operated entertainment and game device as defined in claim 1, wherein a plurality of devices are interconnected into networked groups.

30. A program controlled coin-operated entertainment and game device as defined in claim 1, wherein a plurality of devices are connected with a common, central coin processing device.

* * * * *